United States Patent [19]

Cespon

[11] 4,096,314

[45] Jun. 20, 1978

[54] PRESSURE-SENSITIVE TRANSFER SHEET

[75] Inventor: Manuel Cespon, Vienna, Austria

[73] Assignee: Kores Holding Zug AG, Zug, Switzerland

[21] Appl. No.: 691,730

[22] Filed: Jun. 1, 1976

[30] Foreign Application Priority Data

Jun. 6, 1975 Austria .................................. 4333/75

[51] Int. Cl.$^{2}$ ........................... B32B 3/26; B41M 5/16

[52] U.S. Cl. .................................... 428/307; 427/150; 427/151; 428/323; 428/327; 428/484; 428/486; 428/488; 428/913; 428/914

[58] Field of Search ............... 428/323, 488, 486, 484, 428/307, 914, 913, 327; 427/150, 151; 282/27.5

[56] References Cited

U.S. PATENT DOCUMENTS

| | | | |
|---|---|---|---|
| 2,950,213 | 8/1960 | Streck | 428/488 |
| 3,087,832 | 4/1963 | Fogle | 428/484 |
| 3,382,088 | 5/1968 | Noda | 428/488 |
| 3,432,327 | 3/1969 | Kan | 428/323 |
| 3,449,149 | 6/1969 | Toussaint | 428/488 |
| 3,732,120 | 5/1973 | Brockett | 428/323 |
| 3,900,671 | 8/1975 | Evans | 428/323 |
| 3,916,070 | 10/1975 | Ozutsumi | 428/323 |
| 3,940,539 | 2/1976 | Horimouchi | 428/323 |

*Primary Examiner*—Ellis Robinson

*Attorney, Agent, or Firm*—Ernest F. Marmorek

[57] ABSTRACT

A pressure-sensitive transfer sheet, includes a carrier sheet having at least one surface portion, a substrate disposed on the surface portion and a transfer layer disposed on the substrate. The substrate includes two chemical compositions which react together under pressure contact in order to change the color of one and the transfer layer transfers by pressure the new color to an object.

7 Claims, 3 Drawing Figures

PRESSURE-SENSITIVE TRANSFER SHEET

CROSS REFERENCE TO RELATED APPLICATIONS

Reference is had to the following co-pending patent applications which have the same assignee as the instant patent application: Ser. No. 485,434, filed July 3, 1974; Ser. No. 399,501, filed Sept. 21, 1973; Ser. No. 655,019, filed Feb. 4, 1976; and Ser. No. 569,360, filed Apr. 18, 1975.

The invention relates to a pressure-sensitive transfer sheet, and more particularly to an improved transfer sheet which can be handled in a clean manner and which will provide a pressure transfer to an untreated surface to provide a visible image.

BACKGROUND OF THE INVENTION

Generally, it is known to produce a transfer sheet comprising a carrier sheet and pigment layer disposed on a surface thereof so that through the application of pressure a portion of the pigment layer is transferred onto a copying sheet.

Basically, two types of transfer sheets have been developed. One type is the so-called two-sheet system which requires two special sheets. The lower surface of one sheet has a layer of a chemical composition disposed thereon and the upper surface of the other sheet has a layer of another chemical composition disposed on it. Pressure on the upper surface of the upper sheet brings the two chemical compositions in pressure contact and results in a visible image on the upper surface of the lower sheet. Neither one of the sheets will produce such a visible image with an untreated sheet. Generally, each sheet for the two-sheet system is treated to have the two chemical compositions on opposite surface portions so that several copies can be produced simultaneously.

The other type of transfer sheet is the so-called single-sheet system and was developed subsequent to the introduction of the two-sheet system. The single-sheet system includes a carrier sheet having a pigment layer disposed on one surface and a transfer layer disposed on the pigment layer. Pressure on the inner surface of the carrier sheet results in a transfer of a portion of the transfer layer to a surface in pressure contact such as a copying sheet and this transfers a portion of the pigment layer to the copying sheet.

These prior art systems have the disadvantage that they can smear because of the pigment layer. Thus, the copying sheet has a smudgy appearance.

Another known single-sheet system includes a carrier sheet, a pigment layer disposed on a surface thereof, and an opaque layer disposed on the pigment layer. Pressure contact on the opaque layer destroys its opacity so that the pigment layer becomes visible.

In order to avoid the disadvantages of the so-called mechanical copying sheets, transfer sheets based on chemical reactions were developed.

Generally, a so-called chemical transfer sheet includes a top sheet having disposed on it lower surface an isolated intermediate dye product dissolved in a solvent and a bottom sheet having disposed on its upper surface a layer of a chemical composition having an acid component. Pressure contact of the dye product and the acid component produces a color change which forms a visible image on the upper surface of the lower sheet. Typically, the intermediate dye product can be crystal violet lactone, malachite green lactone, rhodamine-B lactam, Spyropyrane, and the like. Typically, the acid components can be acid clays such as Attapulgit, kaolin and the like, or phenols having acid terminal groups. The aforementioned patent applications point out the use of a chloride of a metal having an atomic weight between 50 and 66, preferably zinc chloride.

For the chemical compositions, the pressure produced by writing or the like destroys the layer of insulation of the dissolved dye product so that the dye product is transferred to the layer containing the acid component. In particular, a solvent is not needed if the acid component is a metallic chloride.

In a further development of the prior art, the intermediate dye product is micro-encapsulation. Other embodiments include micro-encapsulating the acid component or the solvent.

Transfer sheets using the micro-encapsulated dye product are generally called self-copying sheets and one type is sold under the trade name of Intus-paper. Typically, the underside of the top sheet has the micro-encapsulated dye product and the top surface of the lower sheet has the acid component. Pressure on the upper sheet forces the dye product out of its insulating capsule and into pressure contact with the acid component to produce a color reaction.

Generally, no successful transfer sheet suitable for transferring the visible image onto an untreated surface has been developed.

For a transfer sheet to be useful, it is important that it produce a copy having a sharp contour and definition. Generally, sharp contours have not been possible in the case of chemical transfer sheets, particularly for micro-encapsulated intermediate dye products.

SUMMARY OF THE INVENTION

One of the principle objects of the invention is a pressure-sensitive transfer sheet which can pressure transfer a well-defined image to an untreated surface.

Another object of the instant invention is a pressure-sensitive transfer sheet including a carrier sheet having at least one surface portion, a substrate disposed on the surface portion and comprising a first chemical composition having an acid component and a second chemical composition having a first color and being capable of being activated by the acid component to produce a color change to a second color upon pressure contact between the two chemical compositions, and a layer disposed on the substrate and comprising transfer means operable for pressure transfers of the second color to an object.

Further objects and advantages of the invention will be set forth in part in the following specification and in part will be obvious therefrom without being specifically referred to, the same being realized and contained as pointed out in the claims hereof.

The invention accordingly comprises the features of construction, combination of elements and arrangement of parts which will be simplified in a construction hereinafter set forth and the scope of the application of which will be indicated in the claims.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
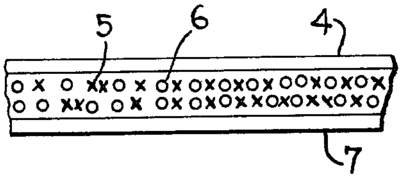
FIG. 1 is a pictorial side elevational view of a transfer sheet according to the instant invention.
Figure 2:
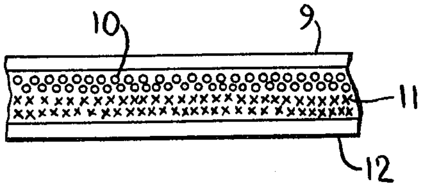
FIG. 2 is a pictorial side elevational view of another transfer sheet according to the instant invention.
Figure 3:
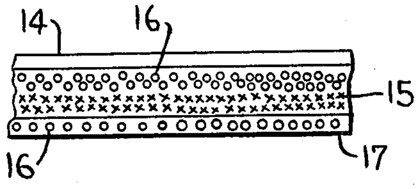
FIG. 3 is a pictorial side elevational view of a further transfer sheet according to the instant invention.

In carrying the invention into effect, some embodiments have been selected for illustration in the accompanying drawings and for description in the specification, reference being had particularly to FIGS. 1 to 3.

In FIG. 1, a carrier sheet 4 has a substrate disposed on one surface portion and comprising a first chemical composition 5 having an acid component and a second chemical composition 6 having a first color acid--actinable, that is, capable of capable of being activated by the acid component to produce a color change to a second color upon pressure contact between two chemical compositions. The figure shows that the components are separate but in juxtaposition. Transfer means 7 in the form of a layer is disposed on the substrate.

The first chemical composition 5 can be an acid clay such as Attapulgit or kaolin or the like or an acid phenolic derivative or a chloride of a metal having an atomic weight from 50 to 66, preferably zinc chloride.

The second chemical composition 6 is an intermediate dye product such as crystal violet lactone, malachite green lactone, Spyropyrane, rhodamine-B lactam or the like. Suitable intermediate dye products are well known from the prior art literature. The transfer means 7 is typically a wax such as carnauba wax, amide wax, polyethylene wax, hard wax, micro-wax, ceresine wax, ozocerite, or mixtures thereof.

In use, the transfer means 7 is placed on an object and writing or drawing is carried out on the upper surface of the carrier sheet 4. This results in pressure contact between the two chemical compositions 5 and 6 to produce a change in the color of the chemical composition 6. The pressure on the upper surface of the carrier sheet 4 also causes the pressure contact of the transfer means 7 and the surface of the object selected and portions of the transfer means 7 become connected to the object and carry with it a portion of the chemical composition 6 which has changed its color.

Thus, the instant invention combines the principles of both chemical copying and mechanical copying to produce a transfer sheet possessing the advantages of both systems.

It is advantageous to have at least one of the chemical compositions micro-encapsulated, preferably at least the chemical composition 6.

The substrate can include the two chemical compositions 5 and 6 as a mixture or as distinct layers as shown in FIG. 2. In FIG. 2, a carrier sheet 9 has disposed on a surface portion a layer of chemical composition 10 having a first color and being capable of being activated by an acid component to produce a color change to a second color upon pressure contact with the acid component. Disposed on the layer of the chemical composition 10 is a layer of a chemical composition 11 having an acid component. A layer of the transfer means 12 is disposed on the chemical composition 11.

FIG. 3 shows still another embodiment in which a carrier sheet 14 has disposed on its surface portion, a layer of a chemical composition 16 similar to the chemical composition 10. The layer of the chemical composition 15 is disposed on the chemical composition 16 in correspondence with the layer of the chemical composition 11. A layer of the transfer means 17 is similar to the transfer means 12 but for the presence of the chemical composition 16 within the layer of the transfer means 17. For this embodiment, the coloring reaction also takes place in the transfer means 17 and thereby intensifies the color reaction and increases the advantages of the instant invention. It is preferable to have the chemical composition 16 micro-encapsulated, particularly for the embodiment shown in FIG. 3. The micro-capsules can be present as a separate layer.

The carrier sheet 14 can be ordinary paper or a sheet or film of plastic composed of polyethylene or polypropylene or the like.

The micro-encapsulation of the intermediate dye product can be produced by coacervation of the gelatine as described in the Austrian Pat. No. 199,206 or through the separation of a polymer above the solvent droplet with the addition of a second polymer in accordance with the "Solvens-Antisolvens" principle as described in the Austrian Pat. Nos. 227,664 and 231,962.

Another method of micro-encapsulation is through the use of an aminoplast condensate such as aminoaldehydic resin condensates. This is described in the Austrian Pat. Nos. 314,482 and 321,867.

The binding agent for the micro-encapsules of the intermediate dye product can be polyvinyl alcohol, polyvinyl chloride, polyvinyl acetate, polystyrene, ethyl cellulose, acrylate dispersions, and other known binding agents.

In practice, the acid components are usually imbedded in a binding agent layer preferably polyvinyl alcohol, gum arabic, starch, latex, polyvinyl chloride, polyvinyl acetate, polyvinyl chloride acetate, ethyl cellulose, or other known softening agents, filler materials, metal stearates, or the like. See the aforesaid application for examples.

The following examples are intended to illustrate the invention and are not intended to limit the scope of the invention.

EXAMPLE 1

A layer of encapsulated crystal violet lactone dissolved in a solvent was applied jointly with a binding agent to a surface portion of paper. The thickness of the layer was about 6g per square meters. On top of this layer there was applied another layer containing the acid component and comprising a mixture of:

| | |
|---|---|
| Attapulgit | 30 parts by weight |
| Calcium carbonate | 20 parts by weight |
| Polyvinyl alcohol | 8 parts by weight |

The transfer means in the form of wax was applied to the layer containing acid components. This layer had the following composition:

| | |
|---|---|
| Carnauba wax | 80 parts by weight |
| Amide wax | 5 parts by weight |
| Calcium carbonate | 10 parts by weight. |

This wax layer was about 3g per square meter.

EXAMPLE 2

This embodiment is basically the same as the embodiment described in the Example but includes a portion of the micro-encapsulated crystal violet lactone within the wax layer and amounts to about 15 parts by weight. The transfer means for this example is about 3.2g per square meter.

EXAMPLE 3

A polyethylene carrier sheet was used for this example. A layer of micro-encapsulated rhodamine-B lactam was applied to a surface portion of a sheet in a quantity of about 5g per square meter.

The layer containing the acid component included the following:

| | |
|---|---|
| Attapulgit | 20 parts by weight |
| China clay | 20 parts by weight |
| Polyvinyl chloride | 10 parts by weight |

The quantity in this layer was about 3.2g per square meter.

The transfer means included a mixture of the following:

| | |
|---|---|
| Polyethylene wax | 10 parts by weight |
| Hard wax | 60 parts by weight |
| Micro-encapsulated rhodamine-B-lactam solution | 10 parts by weight |

It is preferable to apply a wax layer with a solvent when it contains an encapsulated intermediate dye product. Otherwise, the wax layer can be applied by the so-called melt application.

EXAMPLE 4

A layer of micro-encapsulated Spyropyrane was applied to a sheet of paper with a solvent to have a thickness of about 4g square meters.

The layer containing the acid component had the following composition:

| | |
|---|---|
| Zinc chloride | 10 parts by weight |
| Urea | 4 parts by weight |
| China clay | 30 parts by weight |
| Vinyl acetate co-polymer | 6 parts by weight |

This layer had a thickness of about 2.7g per square meter.

The transfer means had the following composition:

| | |
|---|---|
| Micro-wax | 5 parts by weight |
| Ceresine wax | 70 parts by weight |

The wax was melted and applied to the entire layer which contained the acid component.

EXAMPLE 5

A layer of micro-encapsulated spyopyrane and a layer of an acid component similar to the type given in the Example 4 was applied to a carrier sheet.

The transfer means was a solution having the following composition:

| | |
|---|---|
| Micro-wax | 5 parts by weight |
| Ceresine wax | 70 parts by weight |
| Encapsulated Spyropyrane | 20 parts by weight |
| Ethyl alcohol | 150 parts by weight |

The wax solution was applied to the layer containing the acid components.

The transfer sheet according to the instant invention is suited for the production of copies as well as for use as a typewriter ribbon. Copies obtained are clear and distinct and possess a high degree of fastness to light. Moreover, ribbons or transfer sheets in accordance with the instant invention can be handled in a clean manner.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A pressure-sensitive transfer sheet which can be handled in clean manner, consisting essentially of: (1) a carrier sheet; (2) a color-changing substrate on one side thereof comprising an acid component and, separated therefrom but in juxtaposition thereto, an acid activable dye component, and (3) a wax coating overlying said substrate, said wax being selected from the group consisting of carnauba wax, amide wax, polyethylene wax, hard wax, micro-wax, ceresine wax, ozocerite, and mixtures thereof.

2. A transfer sheet as claimed in claim 12, wherein said acid component and said acid activable dye component are separate layers.

3. A transfer sheet as claimed in claim 1, wherein said acid-activable dye component is in solution and said solution is micro-encapsulated.

4. A transfer sheet as claimed in claim 1, wherein said acid component is an acid clay.

5. A transfer sheet as claimed in claim 1, wherein said acid component is a phenolic compound having acid terminal groups.

6. A transfer sheet as claimed in claim 1, wherein said acid component is a chloride of a metal having an atomic weight between 50 and 66.

7. A transfer sheet as claimed in claim 6, wherein said metal chloride is zinc chloride.

* * * * *